US008712423B1

(12) United States Patent
Oksala et al.

(10) Patent No.: US 8,712,423 B1
(45) Date of Patent: Apr. 29, 2014

(54) CONTROLLING TRANSMISSION RESOURCES IN MOBILE RADIO SYSTEMS WITH DUALTRANSFER MODE

(75) Inventors: Jarkko Oksala, Ylöjärvi (FI); Harri Hiltunen, Kempele (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 996 days.

(21) Appl. No.: 10/530,256

(22) PCT Filed: Apr. 8, 2004

(86) PCT No.: PCT/IB2004/001099
§ 371 (c)(1),
(2), (4) Date: Sep. 1, 2005

(87) PCT Pub. No.: WO2005/099294
PCT Pub. Date: Oct. 20, 2005

(51) Int. Cl.
*H04W 72/00* (2009.01)

(52) U.S. Cl.
USPC ............... 455/452.2; 455/452.1; 455/414.3; 455/432.3

(58) Field of Classification Search
USPC ............ 455/432.3; 370/328, 395.21; 709/235
See application file for complete search history.

(56) References Cited

U.S. PATENT DOCUMENTS

| 6,219,554 B1 * | 4/2001 | Eswara et al. ............. 455/452.1 |
| 6,556,824 B1 | 4/2003 | Tseng et al. |
| 6,771,648 B1 * | 8/2004 | Kim et al. .................. 370/395.2 |
| 7,130,273 B2 * | 10/2006 | Baj .............................. 370/242 |
| 7,301,934 B1 * | 11/2007 | Casati et al. .................. 370/352 |
| 2005/0007993 A1 * | 1/2005 | Chambers et al. ............ 370/349 |
| 2005/0276218 A1 * | 12/2005 | Ooghe et al. .................. 370/229 |

FOREIGN PATENT DOCUMENTS

| GB | 2386282 | 9/2003 |
| WO | WO 0049824 | 8/2000 |
| WO | WO 0176165 | 10/2001 |
| WO | WO 03103235 | 12/2003 |

* cited by examiner

*Primary Examiner* — Marcos Torres

(74) *Attorney, Agent, or Firm* — Ziegler IP Law Group, LLC

(57) ABSTRACT

The invention relates to a method for controlling the use of transmission resources, wherein transmission resources for a transmission between a first entity (200) and a second entity (204) can be used by at least a first connection (205) and a second connection (219), comprising checking (208, 211) whether QoS requirements of the first connection (205) can still be guaranteed when the transmission resources are jointly used by the first connection (205) and the second connection (219), and controlling (212) the use of at least one portion of the transmission resources by at least one of the first (205) and second connections (219), accordingly. The connections may for instance be packet-switched (205) and circuit-switched (219) connections in a General Packet Radio System that is capable of Dual Transfer Mode (DTM).

35 Claims, 8 Drawing Sheets

CONTROLLING TRANSMISSION RESOURCES IN MOBILE RADIO SYSTEMS WITH DUALTRANSFER MODE

CROSS REFERENCE TO RELATED APPLICATIONS

This application is for entry into the U.S. national phase under §371 for International Application No. PCT/IB04/001099 having an international filing date of Apr. 8, 2004, and from which priority is claimed under all applicable sections of Title 35 of the United States Code including, but not limited to, Sections 120, 363 and 365(c).

FIELD OF THE INVENTION

The invention relates to a method for controlling the use of transmission resources, wherein transmission resources of a transmission link between a first entity and a second entity can be used by at least a first connection and a second connection.

BACKGROUND OF THE INVENTION

In packet data systems according to the Third Generation Partnership Project (3GPP) standard, comprising in particular the General Packet Radio Service (GPRS) and its derivatives, Quality of Service (QoS) mechanisms are used for requesting and guaranteeing certain Quality of Service (QoS) criteria for packet data connections, i.e. Packet Data Protocol (PDP) contexts. One example of such a QoS criterion is the bit rate of a connection, but also other QoS parameters that are defined in 3GPP standards may be used.

The bit rate that can be supported by the packet data system is dependent on capabilities of both the mobile station and the network. One of the main limiting factors is the mobile station's multislot class, which indicates the number of Packet Data Channels (PDCHs) that a mobile station can handle (in a GPRS system, this multi-slot class ranges from 1 to 8). Obviously, applications in a mobile station demanding a certain QoS can request only a bit rate that is less or equal to the maximum bit rate supported by the mobile station's multislot class. The network then decides on a Guaranteed Bit Rate (GBR) according to the mobile station's capabilities, but uses also some other network related parameters in said decision, e.g. the network load.

The Dual Transfer Mode (DTM) enables simultaneous Circuit-Switched (CS) and Packet-Switched (PS) connections in mobile radio networks. Basically this means that part of the air interface capabilities of the mobile station are being allocated from pure PS usage also for CS channels. Consequently, the maximum available bit rate for PS connections is lower during DTM activity than during PS-only activity. Since PDP contexts, i.e. packet data connections with a related QoS, are normally reserved for a long time, DTM activity in parallel needs to be taken into account in some way when QoS parameters are requested by a mobile station and guaranteed by the network.

According to 3GPP standards, currently CS connections are prioritised over PS connections during parallel connection set-up (DTM mode establishment). This means also that the applications operating on PS connections and relying on previously negotiated QoS for said PS connections can suffer dramatically from parallel CS connections, because the bit rate of the PS connections may significantly fall below the guaranteed bit rate when parallel CS connections are prioritised, and said applications running on top of said PS connections then may no longer properly function.

Furthermore, when a CS connection is added to already established PS connections, the resources of the mobile station such as processing power and memory limits may be exceeded without control, thus affecting both the PS and CS connections and the applications using said connections.

SUMMARY OF THE INVENTION

It is thus an object of this invention to provide a method, a device, a computer program, a computer program product, a system, a mobile station and a network element for controlling the use of transmission resources that overcomes the above-mentioned problems.

It is proposed that a method for controlling the use of transmission resources, wherein transmission resources for a transmission between a first entity and a second entity can be used by at least a first connection and a second connection, comprises checking whether QoS requirements of said first connection can still be guaranteed when said transmission resources are jointly used by said first connection and said second connection, and controlling the use of at least one portion of said transmission resources by at least one of said first and second connections, accordingly.

Said transmission may for instance be a wire-bound or wireless transmission between a transmitter as a first entity and a receiver as a second entity. Said entities may for instance be protocol entities in said transmitter and receiver, and said transmission may be bound to a logical or a physical link between said protocol entities. Said transmission may be provided by a bearer service. Said transmission resources for said transmission can be used by said at least two connections, which may for instance be packet-switched or circuit-switched connections between said transmitter and receiver. It may then be possible that two packet-switched, two circuit-switched or a packet- and a circuit-switched connection jointly use the transmission resources. Also the use of the transmission resources by more than two connections of the same or different types is possible. It may be possible that one of said connections already has been established before said steps of checking. The data transmission capability of said first and/or second entity may be characterised by said transmission resources, which may for instance represent a number of time slots, frequency channels, polarization modes, antenna beams or similar, that can be supported by said first and/or second entity. Said transmission resources may be different for different constellations of connections. Said transmission resources may further depend on said transmission link between said transmitter and receiver as well. For instance, said transmission resources may not be the whole number of time slots available in an up- or downlink frame, but only a fraction thereof due to the limited ability of the first entity to process large data rates or large numbers of time slots, or due to load restrictions imposed by the second entity. Depending on the QoS requirements of said first connection, which may for instance be defined by a fixed or minimum bit rate, it may be possible that said first and second connection can jointly use the transmission resources for said transmission or not. If joint usage of said transmission resources is possible, said first and second connection may share transmission resources, for instance a couple of time slots per uplink and/or downlink frame may be used by said first connection and a couple of time slots per uplink and/or downlink may be used by said second connection. Joint usage of said transmission resources may not be possible if the demand for transmission resources of one of said connections is larger than the available transmission resources, or if the sum of the demands for transmission resources of both connections is larger than the available transmission resources.

In order to control the use of said transmission resources, said method first checks whether said transmission resources can be jointly used by said first and second connection under observation of the QoS requirements of said first connection. If more than two connections are involved, it has to be checked whether said transmission resources can be jointly used by all of said connections, correspondingly. Said step of checking may comprise transformation of said QoS requirements of said first connection into a measure that can be compared to said transmission resources, or determining the available transmission resources themselves. The QoS requirements or the demand for transmission resources of said second connection may be considered in said step of checking as well. It may be preferred to observe the QoS requirements of the connection that has the lower priority, and to assume that the transmission resources are sufficient to satisfy the QoS requirements or transmission resource demands of the connection that has the higher priority.

According to the outcome of the checking step, the use of at least one portion of said transmission resources by at least one of said first and second connection is controlled. Said control may for instance comprise pausing or releasing of said first connection, or changing the portion of transmission resources that said first connection has been assigned before (involving reduction of the QoS requirements of said first connection and/or changing the portion of transmission resources that can be used by said first connection), in order to increase the portion of available transmission resources for a second connection that is or may be established, or it may comprise blocking of said second connection.

Thus in contrast to prior art, where said second connection is established regardless of the fact whether the QoS requirements of said first connection then can still be guaranteed, according to the present invention, it is first checked if joint usage of the transmission resources under observation of the QoS requirements of said first connection is possible, and, depending on the outcome of this determination, the use of said transmission resources by said first and/or second connection is controlled. This ensures that said first connection always maintains a certain guaranteed QoS, or alternatively is paused or released in a controlled manner. This QoS may be smaller than the QoS that was originally guaranteed to said first connection. However, due to the negotiation on this QoS, the proper functionality of applications using said first connection is ensured. The step of checking considers the transmission resources, that may for instance be limited by the transmission capabilities of said first entity for the requested combination of first and second connection, and thus also ensures that hardware that is used by said first entity is not overloaded by said first and second connection.

According to the method of the present invention, it may be preferred that said step of controlling the use of at least one portion of said transmission resources by at least one of said first and second connections comprises pausing or releasing said first connection, if it is determined that said QoS requirements of said first connection can no longer be guaranteed when said transmission resources are jointly used by said first connection and said second connection.

If it is determined in said step of checking that said at least first and second connections can not jointly use said transmission resources, it may be advantageous to pause or release said first connection, in order to avoid that the application running on top of said first connection, for instance a streaming application, does no longer properly work. Whereas pausing means that the paused connection may be granted access to said transmission resources at a later time instance, releasing (or deactivating) means that a connection is completely terminated. Pausing and releasing may particularly occur for a first connection that has already been established when there arises a request for a second connection which may have a higher priority than the already established first connection, so that it is advantageous to establish the new connection and to interrupt the already established connection. Pausing or releasing said first connection may involve signalling to inform the second entity on said changes.

According to the method of the present invention, it may be preferred that said step of controlling the use of at least one portion of said transmission resources by at least one of said first and second connections comprises blocking said second connection, if it is determined that said QoS requirements of said first connection can no longer be guaranteed when said transmission resources are jointly used by said first connection and said second connection.

Blocking may occur if a (possibly low-priority) second connection has not been established yet and is requesting transmission resources. If it is determined that said requests for transmission resources of said second connection and the QoS requirements of an already established first connection can not be satisfied by the available transmission resources, said second connection is blocked and will not be established.

According to the method of the present invention, it may be preferred that said step of controlling the use of at least one portion of said transmission resources by at least one of said first and second connections comprises reducing the QoS requirements of said first connection and changing the portion of said transmission resources that can be used by said first connection, if it is determined that said QoS requirements of said first connection can no longer be guaranteed when said transmission resources are jointly used by said first connection and said second connection.

If the application that uses said first connection may still properly function when the original QoS requirements are reduced, such a reduction of QoS requirements may be negotiated in said step of controlling, after it has been determined in said step of checking that joint usage of said transmission resources by said first and second connection is not possible and thus said first connection would otherwise be paused or released in favour of said second connection. According to the reduced QoS requirements, then the portion of the transmission resources that can be used by said first connection are changed. Changing said portion may involve signalling to inform the second entity on said changes.

According to the method of the present invention, it may be preferred that said step of controlling the use of at least one portion of said transmission resources by at least one of said first and second connections comprises changing the portion of said transmission resources that can be used by said first connection, if it is determined that said QoS requirements of said first connection can still be guaranteed when said transmission resources are jointly used by said first connection and said second connection.

It may occur that said first connection has been assigned a portion of said transmission resources during its establishment that is larger than actually prescribed by the QoS requirements of said first connection. Said step of checking then determines that the joint usage of said transmission resources is possible; however, in said step of controlling the portion of transmission resources that is used by said first connection still has to be changed to the portion that is actually demanded by its QoS requirements. Changing said portion may involve signalling to inform the second entity on said changes.

According to the method of the present invention, it may be preferred that said steps of checking and controlling are performed before said first and second connection have been established.

Said steps of determining and controlling may for instance be performed prior to or during the establishment phase of said first connection, regardless if a second connection will ever be established or not. The advantage of this approach is that, when the possibility of a future establishment of a second connection that uses the transmission resources jointly with the first connection is considered during the establishment of said first connection, when the QoS requirements of said first connection and the corresponding portion of transmission resources is negotiated between the entities that establish said first connection, this future establishment of said second connection may then take seamlessly place. This may be of particular importance in cases where the second connection has a higher priority than the first connection, so that, when the future possible establishment (and its consumption of transmission resources) is not considered during the establishment of said first connection, there may not be enough transmission resources left when said second connection is to be established, so that the first connection has to be paused or released. Similarly, if the first connection has a higher priority, said second connection may be blocked. In both cases, thus pausing, releasing or blocking of connections is omitted by performing said steps of checking and controlling before the establishment of both connections, so that each connection is assigned a suited portion of said transmission resources.

According to the method of the present invention, it may be preferred that said steps of checking and controlling are performed after said first connection has been established and before said second connection has been established.

If said first connection has already been established, it has been assigned a portion of transmission resources. When a second connection is requested, it is advantageously checked before the establishment of said second connection if said first and second connection can jointly use said transmission resources. Furthermore, instead of assigning said second connection the remaining portion of said transmission resources that are not used by said first connection or blocking said second connection (if there are no priorities of connections or if said first connection has a higher priority), said step of controlling the use of said transmission resources by said first and second connection may reduce the portion of transmission resources that is used by said first connection under consideration of its QoS requirements or under reduction of said QoS requirements, and thus enable an establishment of a second connection that now may use a sufficiently large portion of transmission resources. If said second connection has a higher priority, releasing or pausing of said first connection can be avoided by reducing the portion of transmission resources that are used by said first connection, while still considering its QoS requirements.

It should be noted that a second connection does not necessarily have to be established at all. For instance, if one of said first and second entities is an entity of a mobile station in a wireless communication system, it may be possible that said first connection is established in a cell of said wireless communication system that does not support the joint usage of the transmission resources by two connections, so that said first connection may be assigned all transmission resources. When the mobile moves into a cell that supports the joint usage of the transmission resources by two connections, the above-described cases where a second connection is to be established might occur, and pausing, releasing or blocking of one of said first and second connection then may be necessary. It thus may be advantageous to perform said steps of checking and controlling directly upon entry of said mobile station into said cell that supports joint usage of transmission resources by two connections, so that the transmission resources assigned to said first connection are reduced to a degree that allows seamless addition of a future possible second connection.

According to the method of the present invention, it may be preferred that said transmission resources characterise the data transmission capabilities of said first and/or second entity.

The amount of data that can be transmitted between said first entity and said second entity may be characterised by the number of units in an orthogonal or pseudo-orthogonal transmission space that said connections can use, for instance by the number of time slots, frequency channels, polarization states, antenna beams or code channels assigned to said connections. If said first and second entity are located in a mobile station and a network of a mobile radio system, for instance a mobile radio network comprising a radio access network and/or a core network of said mobile radio system, usually not all time slots, frequency channels, codes, etc. will be allocated by the network to one mobile station, in order to allow for multiple access of several mobile stations. Thus the resources that are available for connections between said first and second entity are limited by the network. Furthermore, the data processing power and memory of the mobile station further reduces the amount of data said mobile station can transmit and receive, so that the resources that can be used by said connections may be further reduced.

The transmission resources that can be used by said connections for transmission between said first and second entity thus may be understood to be limited by both said first and second entity.

According to the method of the present invention, it may be preferred that said step of checking is at least partially performed by a transmission resources control instance that interacts with said first and/or second entity.

Said transmission resources control instance may for instance at least partially perform or initiate said step of checking whether the QoS requirements of a first connection may still be guaranteed when the transmission resources are jointly used by said first and a second connection.

According to the method of the present invention, it may be preferred that said step of checking comprises the step of checking capabilities of hardware that is used by said first or second entity.

In said step of checking, it is advantageous that information on the QoS requirements of said first connection, on the consumption of transmission resources by said second connection and on the transmission resources themselves is available, in order to be able to determine whether joint usage of the transmission resources is possible. Knowledge of said transmission resources may be based on knowledge on the capabilities of hardware that is used by said first and/or second entity, for instance information on the maximum processing power or the maximum memory capacity. Such knowledge may be available in the form of profiles for different constellations of connections, to account for the different processing power and memory requirements of different mixes of different-type connections.

According to the method of the present invention, it may be preferred that said entities are contained in a mobile station and in a network of a wireless communication system, in particular a 2G or 3G mobile radio system. Said network may for instance be a mobile radio network comprising a radio access network and/or a core network of said wireless communication system. Said wireless communication system may for instance operate at least partially according to the General Packet Radio Service (GPRS) standard, the Enhanced GPRS (EGPRS) standard, the Enhanced Data Rates for GSM Evolution (EDGE) standard, the Universal Mobile Telecommunications Standard (UMTS), or any other telecommunications standard. Furthermore, said wireless communication system may operate according to Wireless Local Area Network (W-LAN) standards such as HiperLAN, HiperLAN/2 or IEEE 802.11 and its derivatives.

According to the method of the present invention, it may be preferred that said connections are packet-switched and/or circuit-switched connections between said entities in said mobile station and said network. Said wireless communication system then may for instance support two or more packet-switched connections jointly using the same transmission resources, or a mix of packet-switched and circuit-switched connections.

According to the method of the present invention, it may be preferred that said QoS requirement of said first connection is a minimum bit rate. Such a QoS requirement may for instance stem from a higher-layer application, as for instance a streaming application, or a downloading application. Other QoS parameters such as for instance mean or maximum delay of packets, or combinations of QoS parameters in the form of QoS profiles may be applied as well.

According to the method of the present invention, it may be preferred that said wireless communication system is capable of operating a Dual Transfer Mode (DTM) that comprises a packet-switched connection, in particular a connection according to the General Packet Radio Service (GPRS) or the Enhanced General Packet Radio Service (EGPRS), as said first connection and a circuit-switched connection as said second connection, and wherein said step of checking determines whether bit rate requirements of said packet-switched connection can still be guaranteed when said transmission resources are jointly used by said packet-switched and said circuit switched connection.

According to the method of the present invention, it may be preferred that said packet-switched and circuit-switched connections are provided by a radio bearer, and that in said step of checking, said transmission resources control instance informs said bearer on the availability of said transmission resources.

Said bearer, for instance a GPRS bearer, then may use the services of said transmission resources control instance to check the actual availability of transmission resources, which may for instance represent the portion of transmission resources that is not assigned to a connection yet, so that it may be determined if said packet-switched and circuit-switched connections may share said transmission resources by determining if said available transmission resources are sufficient for said circuit-switched connection.

According to the method of the present invention, it may be preferred that said transmission resources control instance monitors the connections provided by said bearer and, based at least on said monitored connections and on hardware profiles of said mobile station, determines the availability of said transmission resources.

Said transmission resources control instance may monitor the number and type of connections that are already active with said mobile station and may consult mobile-station-specific hardware profiles that may have been stored in said transmission resources control instance to determine the present portion of available transmission resources. Said hardware profile may be developed for said mobile station during R&D and may consider the different charge of the mobile station concerning processing power and memory usage depending on the composition of packet-switched and/or circuit-switched connections.

It is further proposed a computer program with instructions operable to cause a processor to perform the above-mentioned method steps.

It is further proposed a computer program product comprising a computer program with instructions operable to cause a processor to perform the above-mentioned method steps.

It is further proposed a wireless communication system, comprising at least one mobile station, and at least one network, wherein transmission resources for a transmission between a first entity and a second entity can be used by at least a first connection and a second connection, wherein it is checked whether QoS requirements of said first connection can still be guaranteed when said transmission resources are jointly used by said first connection and said second connection, and wherein the use of at least one portion of said transmission resources by at least one of said first and second connections is controlled, accordingly.

Said wireless communication system may for instance be a 2G or 3G mobile radio system supporting DTM of packet-switched and circuit switched connections and guarantees QoS at least for the packet-switched connections. Said network may comprise a radio access network and/or a core network of said wireless communication system.

It is further proposed a device for controlling the use of transmission resources, wherein transmission resources for a transmission between a first entity and a second entity can be used by at least a first connection and a second connection, the device comprising means for checking whether QoS requirements of said first connection can still be guaranteed when said transmission resources are jointly used by said first connection and said second connection, and means for at least partially controlling the use of at least one portion of said transmission resources by at least one of said first and second connections, accordingly.

Said device may be part of a mobile station or of a network of a wireless communication system, wherein said network may comprise a radio access network and/or a core network. Said device may for instance be embodied as an Application Specific Integrated Circuit (ASIC) that implements said means for checking and controlling.

It is further proposed a mobile station in a wireless communication system, wherein transmission resources for a transmission between a first entity in said mobile station and a second entity in a network of said wireless communication system can be used by at least a first connection and a second connection, said mobile station comprising means for checking whether QoS requirements of said first connection can still be guaranteed when said transmission resources are jointly used by said first connection and said second connection, and means for controlling the use of at least one portion of said transmission resources by at least one of said first and second connections, accordingly. Said network may comprise a radio access network and/or a core network of said wireless communication system.

According to the mobile station of the present invention, it may be preferred that said transmission resources characterise the data transmission capabilities of said mobile station and/or network.

According to the mobile station of the present invention, it may be preferred that said means for checking whether QoS requirements of said first connection can still be guaranteed when said transmission resources are jointly used by said first connection and said second connection comprises a transmission resources control instance that interacts with said first entity in said mobile station.

According to the mobile station of the present invention, it may be preferred that said means for checking whether QoS requirements of said first connection can still be guaranteed when said transmission resources are jointly used by said first connection and said second connection comprises means for checking capabilities of hardware that is used by said first or second entity.

According to the mobile station of the present invention, it may be preferred that said wireless communication system is capable of operating a Dual Transfer Mode (DTM) that comprises a packet-switched connection, in particular a connection according to the General Packet Radio Service (GPRS) or the Enhanced General Packet Radio Service (EGPRS), as said first connection and a circuit-switched connection as said second connection, and that said means for checking determines whether bit rate requirements of said packet-switched connection can still be guaranteed when said transmission resources are jointly used by said packet-switched and said circuit switched connection. Packet-switched connections according to other types of third generation (3G) radio communication standards or future radio communication standards, as well as packet-switched connections according to present and future Wireless Local Area Network (W-LAN) standards are envisaged here as well.

According to the mobile station of the present invention, it may be preferred that said packet-switched and circuit-switched connections are provided by a radio bearer, and that said transmission resources control instance comprises means for informing said bearer on the availability of said transmission resources.

According to the mobile station of the present invention, it may be preferred that said transmission resources control instance comprises means for monitoring the connections provided by said bearer and for determining the availability of said transmission resources, wherein said determining is at least based on said monitored connections and an on hardware profiles of said mobile station.

It is further proposed a network element in a wireless communication system, wherein transmission resources for a transmission between a first entity in a mobile station and a second entity in a network of said wireless communication system can be used by at least a first connection and a second connection, said network element comprising means for checking whether QoS requirements of said first connection can still be guaranteed when said transmission resources are jointly used by said first connection and said second connection, and means for controlling the use of at least one portion of said transmission resources by at least one of said first and second connections, accordingly. Said network element may for instance be a part of said network, or may co-operate with said network.

These and other aspects of the invention will be apparent from and elucidated with reference to the embodiments described hereinafter.

DETAILED DESCRIPTION OF THE INVENTION

Figure 1:
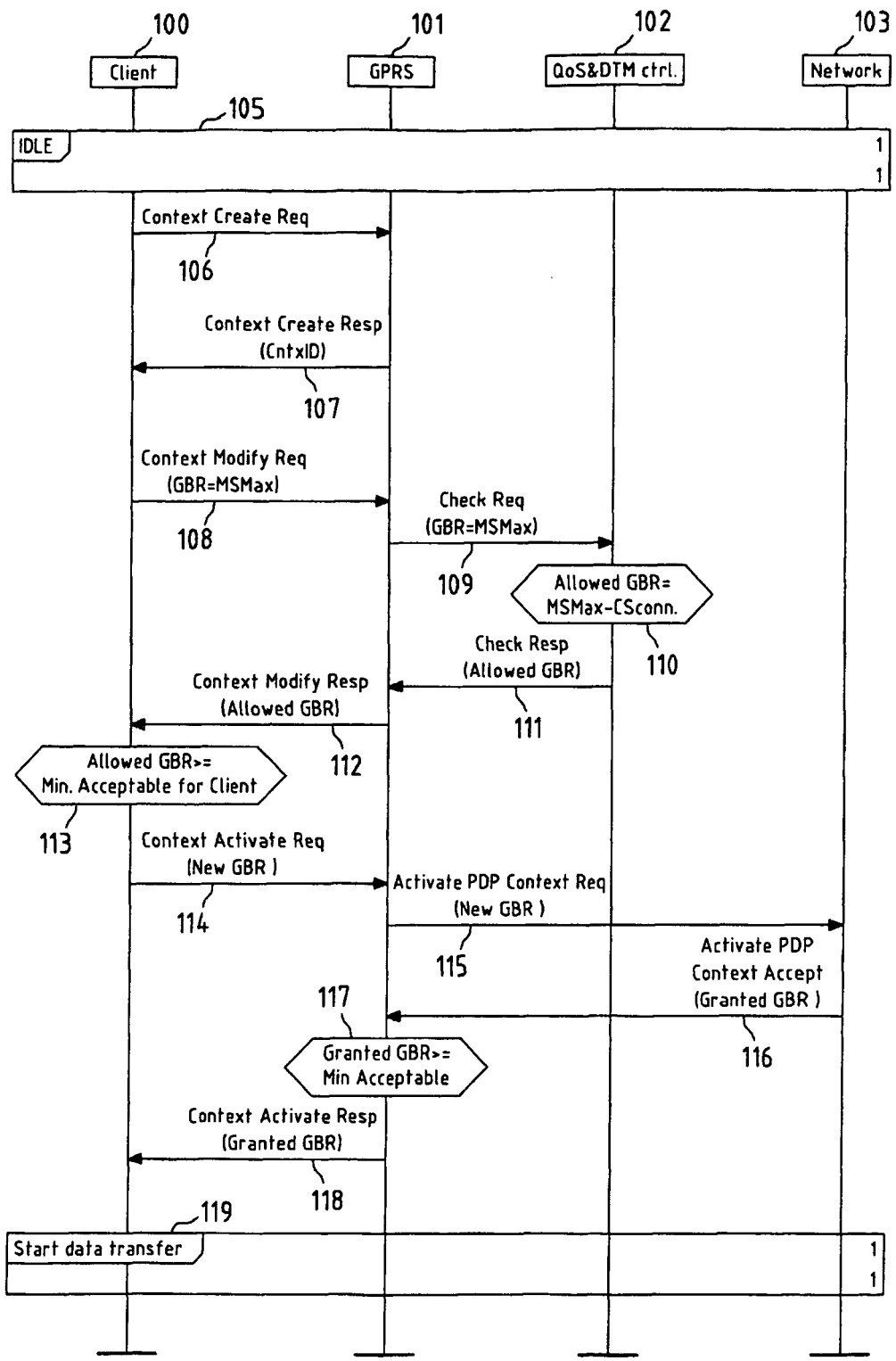
FIG. 1: a message sequence chart of the method according to the present invention, wherein a packet-switched connection is established under consideration of a further possible circuit-switched connection.

FIG. 1 represents a message sequence chart of the method according to the present invention, wherein a packet-switched (PS) connection is established under consideration of a further possible circuit-switched (CS) connection. A mobile radio system with a General Packet Radio Service (GPRS) radio bearer and the capability to support both PS and circuit-switched connections in a Dual Transfer Mode (DTM) is exemplarily considered here. It is readily seen that, by exchanging the radio bearer, the following embodiments of the present invention also apply to 3G systems as for instance the Universal Mobile Telecommunications System (UMTS).

The four vertical lines in FIG. 1 may be considered as service access points of a client (mobile station) 100, a GPRS bearer 101, a QoS & DTM control instance 102 and a network 103, and the arrows between said vertical lines represent service primitives that are exchanged between said service access points.

As indicated by step 105 in FIG. 1, the mobile radio system is initially in an idle state. When a Packet Data Protocol (PDP) Context Create Request 106 is generated by client 100, which requests the establishment of a PS connection with a certain Quality of Service (QoS), the GPRS bearer 101 responds with a Context Create Response 107 that carries a Context Identifier as parameter.

According to the present invention, said client 100 then sends a Context Modify Request 108 to GPRS bearer 101, carrying the parameter Guaranteed Bit Rate (GBR). Said GBR parameter is set to its maximum value, which corresponds to the maximum number of Multislots (MSMax), wherein the number of multislots identifies the number of Packet Data Channels (PDCHs) that a mobile station in a GPRS system can handle in parallel (ranging from 1 to 8). If said bearer 101 was a 3G bearer instead of a GPRS bearer, the supported bit rate instead of the number of multislots may be be used as a basis for the negotiation of the GBR.

Said GPRS bearer 101 then sends a Check Request 109 to said QoS & DTM control instance 102, which first determines the available transmission resources that can be granted to said PS connection when considering a possible future establishment of a circuit-switched connection. Said available transmission resources that are determined in step 110 are represented by the allowed GBR, which is the difference between MSMax and the parameter CSConn, which indicates how many time slots are required by said possible future circuit-switched connection. The QoS & DTM control instance 102 responds with a Check Response 111 that carries said allowable GBR as parameter, and said allowable GBR is then sent to said client 100 via a Context Modify Response 112 that corresponds to said Context Modify Request 108. At the client side, it has no to be determined in a step 113 whether said allowed GBR is large enough to satisfy the QoS requirements of said PS connection that is requested by an application at said client side.

According to the example of FIG. 1, said allowed GBR is in deed large enough to satisfy the QoS requirements of said PS connection, so that, as seen from the client side, the joint usage of the transmission resources by said PS connection and said future possible circuit-switched connection is possible.

Said client 100 then sends a Context Activate Request 114 with said allowable GBR or a smaller GBR that still matches its QoS requirements as parameter "new GBR" to the GPRS bearer 101, which sends a corresponding Activate PDP Context Request that contains QoS parameters comprising said new GBR to the network 103. The network 103 determines if said new GBR can be guaranteed, for instance based on the network load or further parameters, and responds with an Activate PDP Context Accept 116 with the granted GBR as a parameter. The GPRS bearer 101 determines in a step 117 if the GBR as granted by the network is acceptable with respect to the new GBR parameter that was sent by the client in step 114, and if said QoS is acceptable, responds to the client with a Context Activate Response 118 containing the granted GBR as parameter. Said PS data connection thus has be established, and data transfer on said PS data connection can start in step 119.

It can be readily seen that, according to the example of FIG. 1, the steps of checking and controlling have been performed before the PS connection and the circuit-switched connection have been established. Said step of checking may be identified as a combination of steps 110 and 113, and said step of controlling is initiated in step 114.

Figure 2:
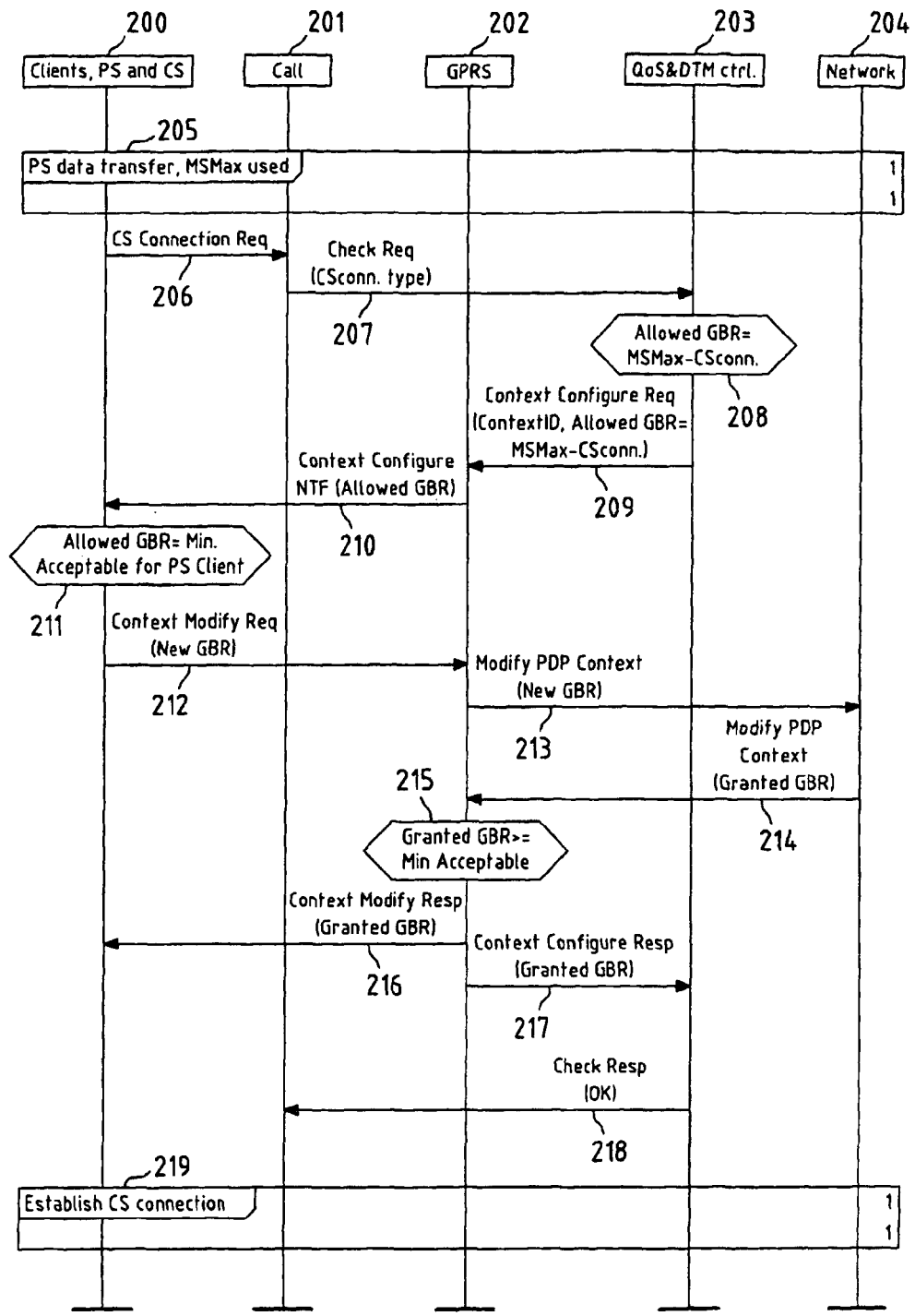
FIG. 2: a message sequence chart of the method according to the present invention, wherein an established packet-switched connection is downgraded in favor of a circuit-switched connection when said circuit-switched connection is actually requested.

FIG. 2 depicts a message sequence chart of the method according to the present invention, wherein an established PS connection is downgraded in favor of a circuit-switched connection when said circuit-switched connection is actually requested. In addition to the client 200, GPRS bearer 202, QoS & DTM control instance 203 and network 204 service access points, there further exists a call instance 201 service access point for the reception of a CS Connection Request 206.

In the example of FIG. 2, a PS connection with a GBR equaling the maximum number of multislots MSMax has already been established and is in use, as indicated by step 205. Said PS connection thus uses all available transmission resources. If a CS connection is requested in step 206, said call instance 201 sends a Check Request service primitive 207 with an identifier of the requested CS connection type to said QoS & DTM control instance 203, which again determines the allowable GBR as the difference of MSMax and CSConn in a step 208. To check whether both said PS and CS connection may use the transmission resources (MSMax) jointly, said QoS & DTM control instance 203 determines whether the PS connection can still meet its QoS requirements when its GBR is reduced from MSMax to the allowed GBR of MSMax-CSConn. To this end, said QoS & DTM control instance 203 sends said allowable GBR to the GPRS bearer 202 with a Context Configure Request 209, that further contains said Context ID of said PS connection. This Configure Request 209 is forwarded to said client side 200 via a Context Configure Notification 210 with the allowable GBR as parameter. The client checks whether said allowable GBR meets the QoS requirements of said PS connection, finds this to be true and initiates a Context Modify procedure that comprises the steps 212-216 that corresponds to the Context Activation procedure of FIG. 1. To inform the call instance 201 on the success of the request to establish a CS call, said GPRS bearer 202 further has to send a Context Configure Response 217 with said granted GBR as a parameter to said QoS & DTM control instance 203, which then sends a Check Response service primitive with the parameter OK to said call instance 201, and the CS connection in DTM mode can be established in step 219.

In this example, thus an already established PS connection is re-configured when the establishment of a CS connection is requested. Before the establishment of said CS connection, it is checked in steps 208 and 211 whether the QoS requirements of said PS connections can be guaranteed when the CS connection and the PS connection share the transmission resources, and in step 212 a control of the use of the transmission resources that are used by said PS connection is initiated.

Figure 3:
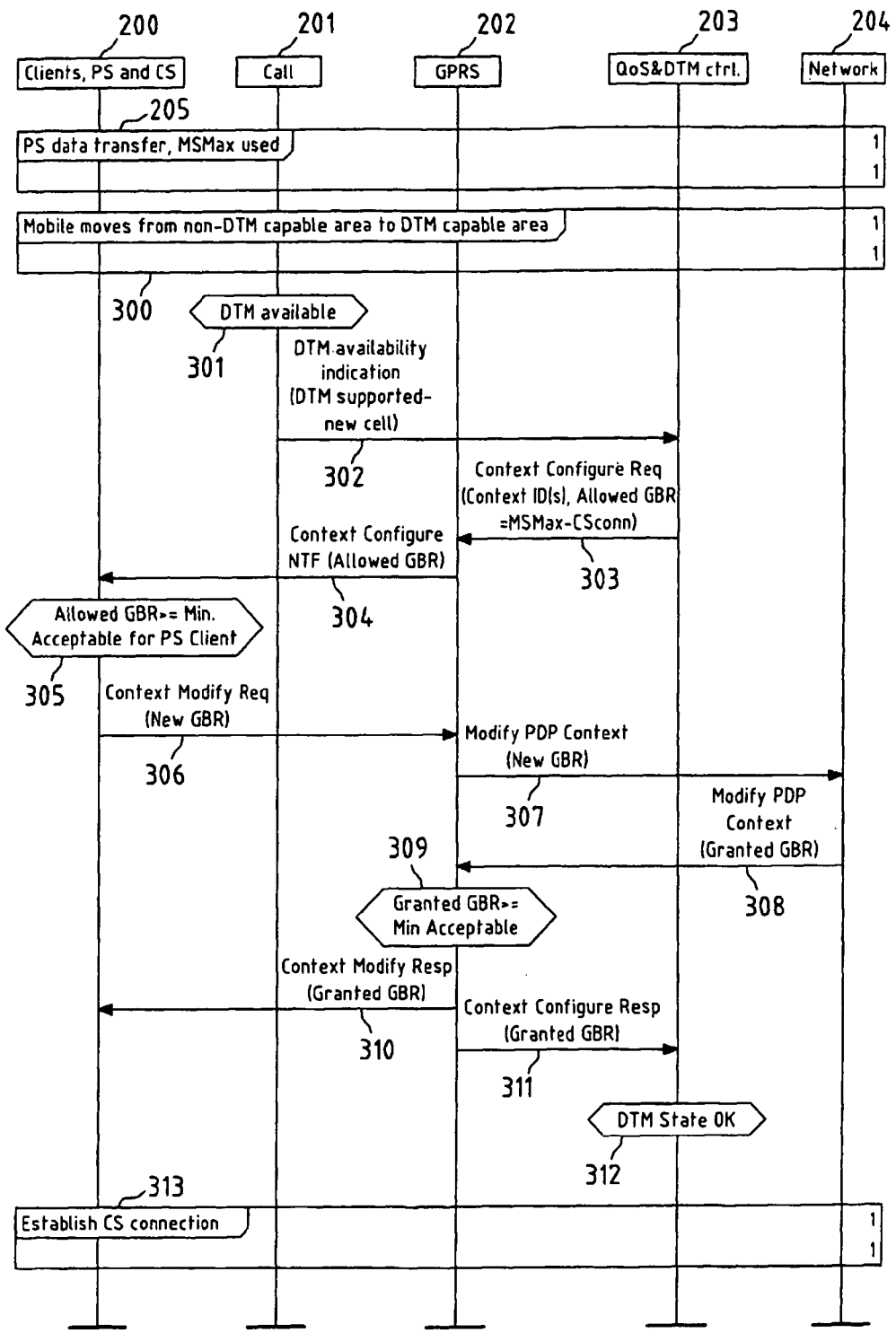
FIG. 3: a message sequence chart of the method according to the present invention, wherein an established packet-switched connection is downgraded in favor of a circuit-switched connection when Dual Transfer Mode (DTM) becomes available.

FIG. 3 depicts a message sequence chart of the method according to the present invention, wherein an established PS connection is downgraded in favor of a circuit-switched connection when Dual Transfer Mode (DTM) becomes available.

The set-up of FIG. 3 is basically the same as in FIG. 2. A PS connection is already established that uses all available transmission resources MSMax. During the establishment of said PS connection, the mobile station (client) was associated with a cell that did not support DTM, so that a future possible DTM mode with joint usage of the transmission resources by a PS and a CS connection was not possible.

However, according to the example of FIG. 3, the mobile station now moves into a cell that supports DTM, as indicated by step 300. A cal instance 201 becomes aware of this in step 301 and sends a DTM availability indication 302 to said QoS & DTM control instance 203. The QoS & DTM control instance 203 now performs a Context Configure procedure comprising the steps 303-311 that corresponds to the Context Configure procedure 209-217 in FIG. 2. In brief, the allowable GBR is determined, signaled to the client who determines if it is acceptable for its PS connection, and, if this is the case, changes its GBR accordingly. After said Context Configure procedure, said QoS & DTM control instance 203 set an internal DTM state to OK in order to indicate that an establishment of a future CS connection now is possible jointly to the already existing PS connection. This may happen in a step 313.

According to this example, the portion of transmission resources used by a PS connection was changed after the establishment of the PS connection, but before the establishment of the CS connection, which does not necessarily have to take place at all. Said step of checking may be identified in step 303 and 305, and said step of controlling may be initiated in step 306. Note that, in contrast to the GPRS system that is exemplarily used in the embodiment of FIG. 3, in a 3G system, as for instance the Universal Mobile Telecommunications System (UMTS), parallel usage of PS and CS connections is supported in every cell, so that it may not be required to detect if DTM is available upon entry into a cell.

Figure 4:
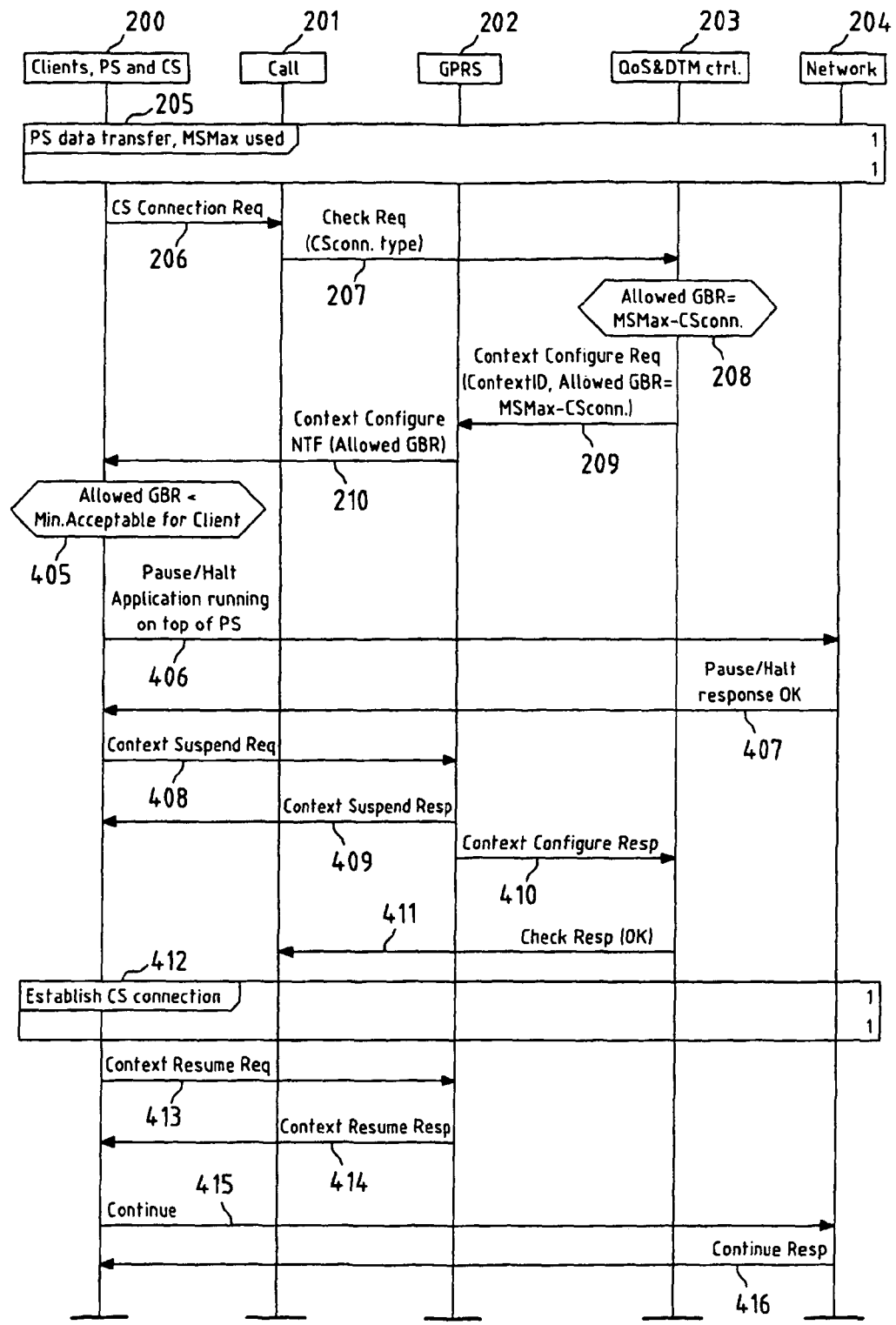
FIG. 4: a message sequence chart of the method according to the present invention, wherein an established packet-switched connection is paused in favor of a circuit-switched connection when said circuit-switched connection is actually requested.

FIG. 4 depicts a message sequence chart of the method according to the present invention, wherein an established PS connection is paused in favor of a circuit-switched connection when said circuit-switched connection is actually requested.

The set-up and steps 205-210 in FIG. 4 are basically the same as in FIG. 2, i.e. a PS connection using all available transmission resources MSMax is already established, a CS connection is requested, and said QoS & DTM control instance 203 has started a Context Configure procedure to check whether the QoS requirements of said PS connection can still be met when said CS connection is established.

However, according to the example of FIG. 3, the mobile station now moves into a cell that supports DTM, as indicated by step 300. A call instance 201 becomes aware of this in step 301 and sends a DTM availability indication 302 to said QoS & DTM control instance 203. The QoS & DTM control instance 203 now performs a Context Configure procedure comprising the steps 303-311 that corresponds to the Context Configure procedure 209-217 in FIG. 2. In brief, the allowable GBR is determined, signaled to the client who determines if it is acceptable for its PS connection, and, if this is the case, changes its GBR accordingly. After said Context Configure procedure, said QoS & DTM control instance 203 set an internal DTM state to OK in order to indicate that an establishment of a future CS connection now is possible jointly to the already existing PS connection. This may happen in a step 313.

When the CS connection has terminated, the PS connection can be resumed by client/GPRS bearer signaling in steps 413 and 414, and the application running on top of the PS connection is continued by signaling between client and network in steps 415 and 416.

According to this example, it was decided after the establishment of a PS connection that said PS connection and a requested CS connection may not jointly use the available transmission resources, and said PS connection was paused. Checking may be identified to be performed in steps 208 and 405, and controlling the use of the transmission resources was initiated in step 408.

Figure 5:
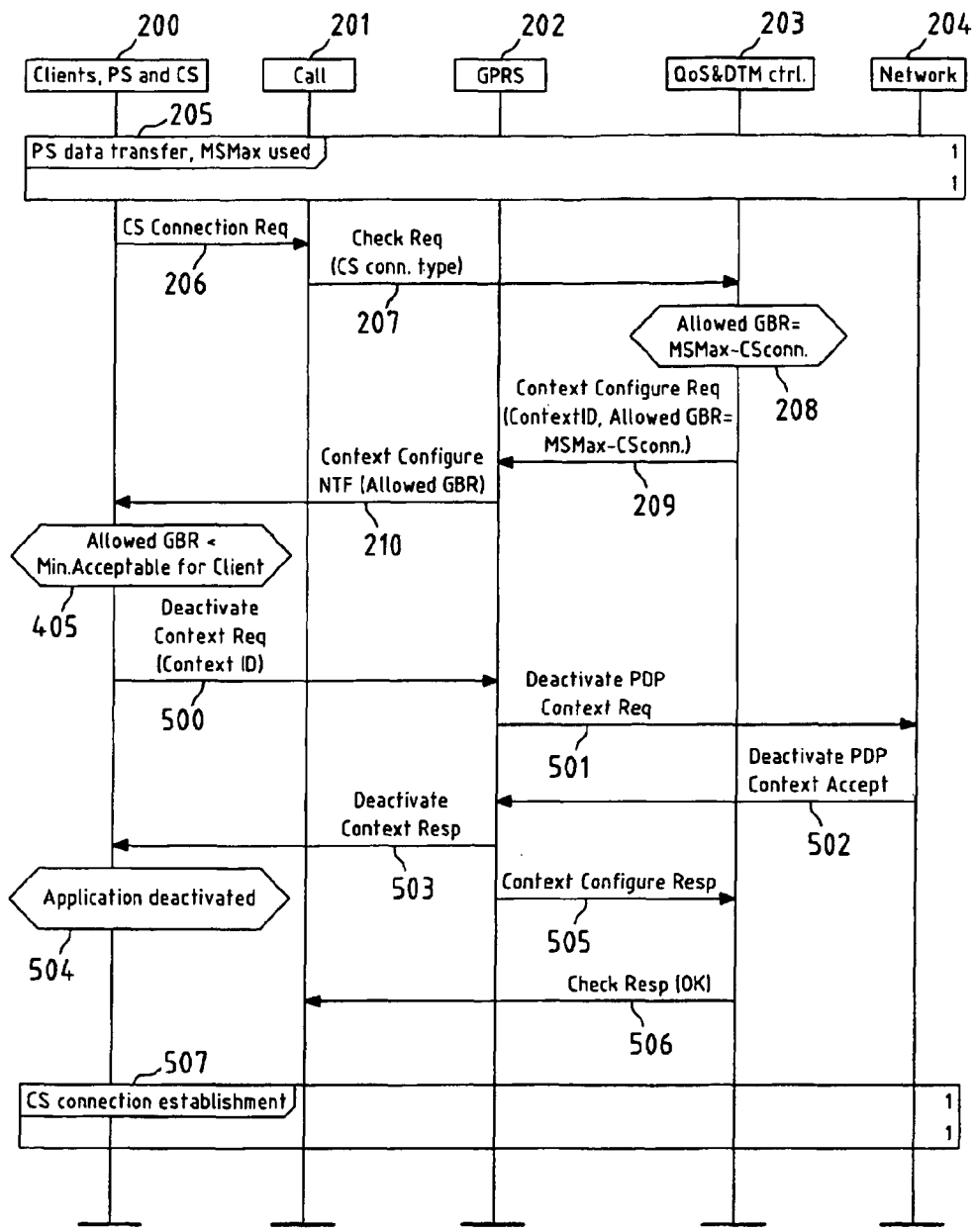
FIG. 5: a message sequence chart of the method according to the present invention, wherein an established packet-switched connection is released in favor of a circuit-switched connection when said circuit-switched connection is actually requested.

FIG. 5 depicts a message sequence chart of the method according to the present invention, wherein an established PS connection is released in favor of a circuit-switched connection when said circuit-switched connection is actually requested.

The set-up of FIG. 5, as well as the steps 205-210 and 405, are equal to FIG. 4, i.e. there is an established PS connection that uses all available transmission resources, a CS connection request and the decision of the client that the allowable GBR does not satisfy the QoS requirements of the PS connection. In contrast to the example of FIG. 4, the PS connection now is deactivated instead of being paused and later resumed. Deactivation takes place between client 200 and GPRS bearer 203 in steps 500 and 503 and between GPRS bearer 203 and network 204 in steps 501 and 502. In step 504, deactivation (or release) of the application is stated, in step 505, the Context Configure procedure initiated by the QoS & DTM control instance 203 with step 209 is terminated, and in step 506, finally the Check Request initiated by the call instance 201 in step 207 is responded with an OK, so that the CS connection can be established in step 507.

Figure 6:
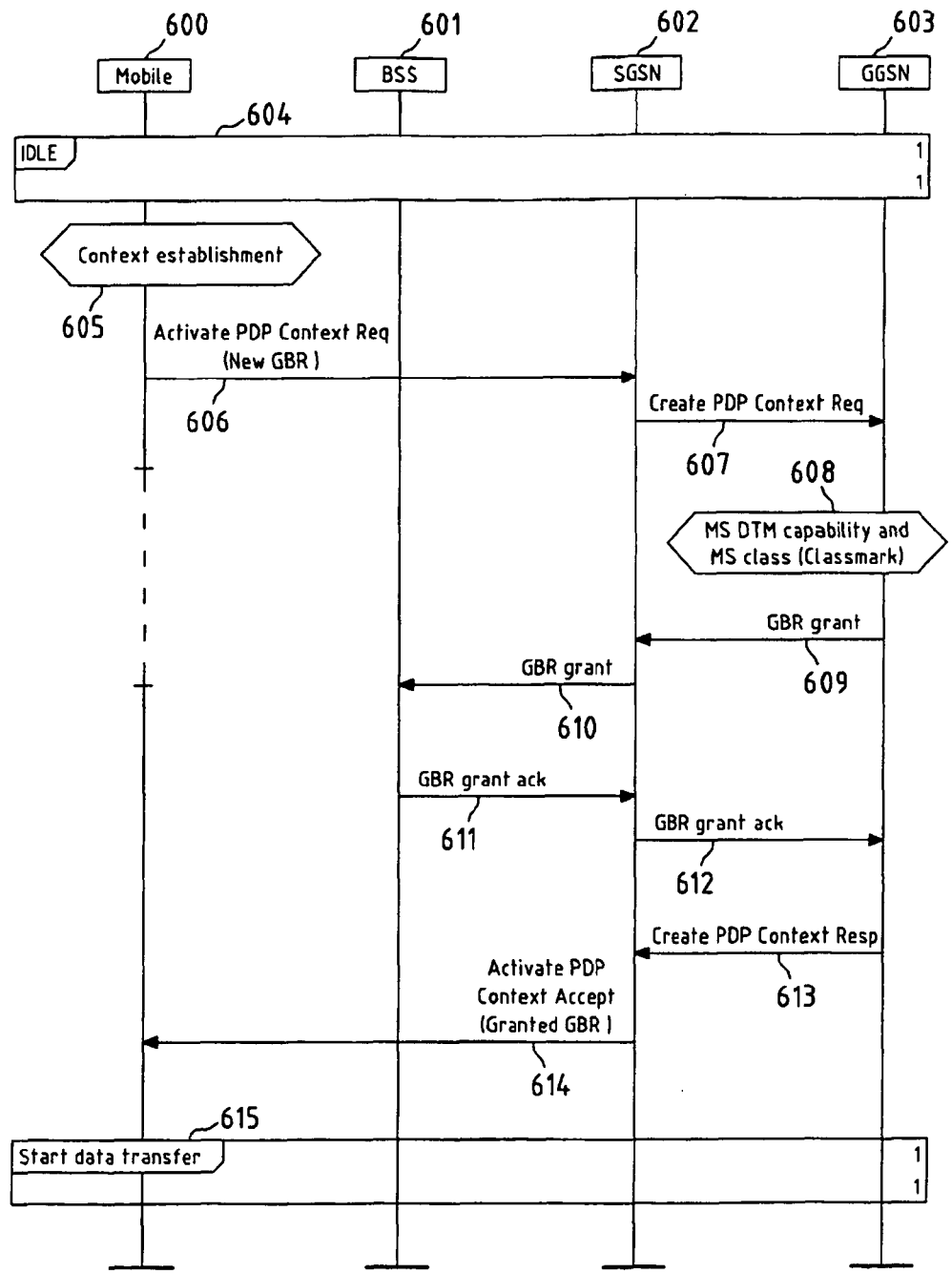
FIG. 6: a message sequence chart of the method according to the present invention, wherein an established packet-switched connection is configured by the network so that DTM with guaranteed QoS is possible.

According to this example, it was decided after the establishment of a PS connection that said PS connection and a requested CS connection may not jointly use the available transmission resources, and said PS connection was deactivated. Checking may be identified to be performed in steps 208 and 405, and controlling the use of the transmission resources was initiated in step 500. FIG. 6 depicts a message sequence chart of the method according to the present invention, wherein an established PS connection is configured by the network so that DTM with guaranteed QoS is possible.

In the set-up of FIG. 6, there are depicted service access points of a mobile station 600, of a Base Station Subsystem (BSS) 601, of a Serving GPRS Support Node (SGSN) 602 and a Gateway GPRS Support Node (GGSN) 603.

The GPRS system with DTM capabilities is initially in an idle state 604. In a step 605, a PS data connection (PDP context) is established similar to the procedure of FIG. 1, i.e. there take place a Context Create Procedure and a Context Modify Procedure, but without the steps involving the QoS & DTM control instance. In a step 606, the activation of the PDP context with a new GBR is requested from the SGSN 602, which sends a Create PDP Context Request 607 to the GGSN 603. In the GGSN 603, the transmission resources (for instance the mobile stations DTM capabilities and the multi-slot class of the mobile station), as far as they are characterised by the mobile station, are considered when deciding on the grant of the requested new GER. In step 608, a GBR is granted to said PS connection that allows for the seamless establishment of a future possible CS connection. This granted GBR is signaled between GGSN 603 and SGSN 602 in step 609 and between SGSN 602 and BSS 601 in step 610. The acknowledgment of the granted GBR by the BSS 601, which may decide if the granted GBR matches the QoS requirements of the PS connection that is requested by said mobile station 600, then is signaled back to the SGSN 602 in step 611 and to the GGSN 603 in step 612. The GGSN 603 then sends a Create PDP context Response 613 to the SGSN 602, and the SGSN 602 sends an Activate PDP Context Accept 614 with the acknowledged granted GBR as parameter back to the mobile 600 that requested the activation of the PDP context. Finally, the data transfer on said PS connection is started in step 615, and a future seamless establishment of a CS connection without conflicting with the transmission resources used by said PS connection is possible.

According to the example of FIG. 6, the step of checking whether the QoS requirements of said PS connection are still guaranteed when a CS connection is additionally established may be identified in steps 608 and between steps 610 and 611, and said step of controlling the use of said transmission resource may be initiated in steps 608 and 613.

Figure 7:
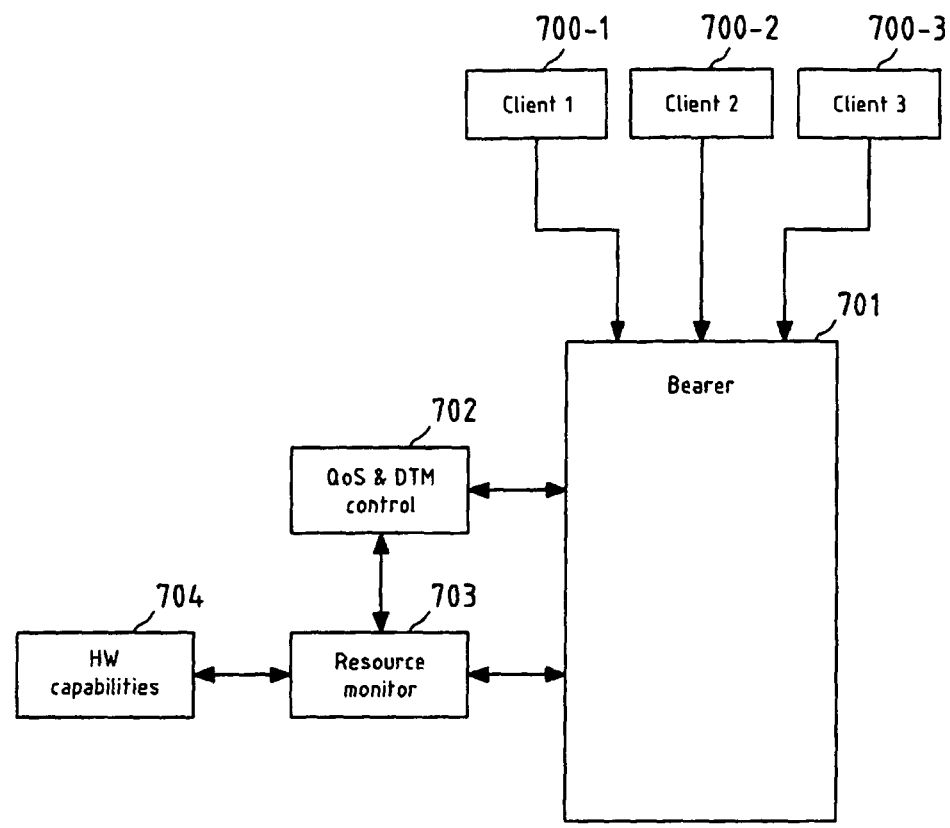
FIG. 7: a representation of the logical components that are required to implement DTM with guaranteed QoS in the mobile station embedded software environment according to the present invention.

FIG. 7 describes the logical components that are required to implement DTM with guaranteed QoS in the mobile station embedded software environment according to the present invention.

Three clients 700-1 ... 700-3 may request PS connections from a bearer 701. When a PS connection is actually requested by one of said clients 700-1 ... 700-3 (cf. for instance step 108 in FIG. 1), the bearer 701 consults the QoS & DTM control instance 702 (cf. step 109 in FIG. 1), which in turn consults the resource monitor 703 that monitors the hardware capabilities of the mobile station the respective client 700-1 ... 700-3 is housed in (cf. step 110 in FIG. 1) and monitors connections that are already provided by said bearer

701. Hardware capabilities may be defined during R&D, where processing power and behavior of the mobile station is defined as hardware profile.

The resource monitor 703 thus compares existing used resources to hardware capabilities, and collects resource critical parameters from the bearer 701, for instance the number of used time slots, the used coding scheme, the used packet size and, based on critical parameters, defines the current resource state of the platform.

Every time when some resource is requested from the bearer 701, the requested resource may be checked using services of the Qos & DTM control instance 702. In the examples of FIGS. 1-6, this may for instance result in the "allowable GBR" that is determined by said QoS & DTM control instance (cf. step 110 in FIG. 1). The Qos & DTM control instance 702 may keep record of existing used resources, like CS connections and possible simultaneous active PS connections, as it is possible with DTM in GPRS/EGPRS mobile stations.

For example, if there is a CS connection active and a new PDP with streaming QoS is requested by one of the clients 700-1 ... 700-3, the Qos & DTM control instance 702 checks if the mobile station is able to handle the requested service. If there are enough resources still available, the request can be continued and appropriate signalling made to the network, as illustrated in FIGS. 1-6.

The Qos & DTM control instance 702 might also give the response to the bearer 701 that the requested service can not be handled by the mobile station, in this case the requested QoS parameters may be downgraded and services from the network may be requested using appropriate parameters. For example, the multislot class for DTM can be changed based on information from the QoS & DTM control instance 702.

Figure 8:
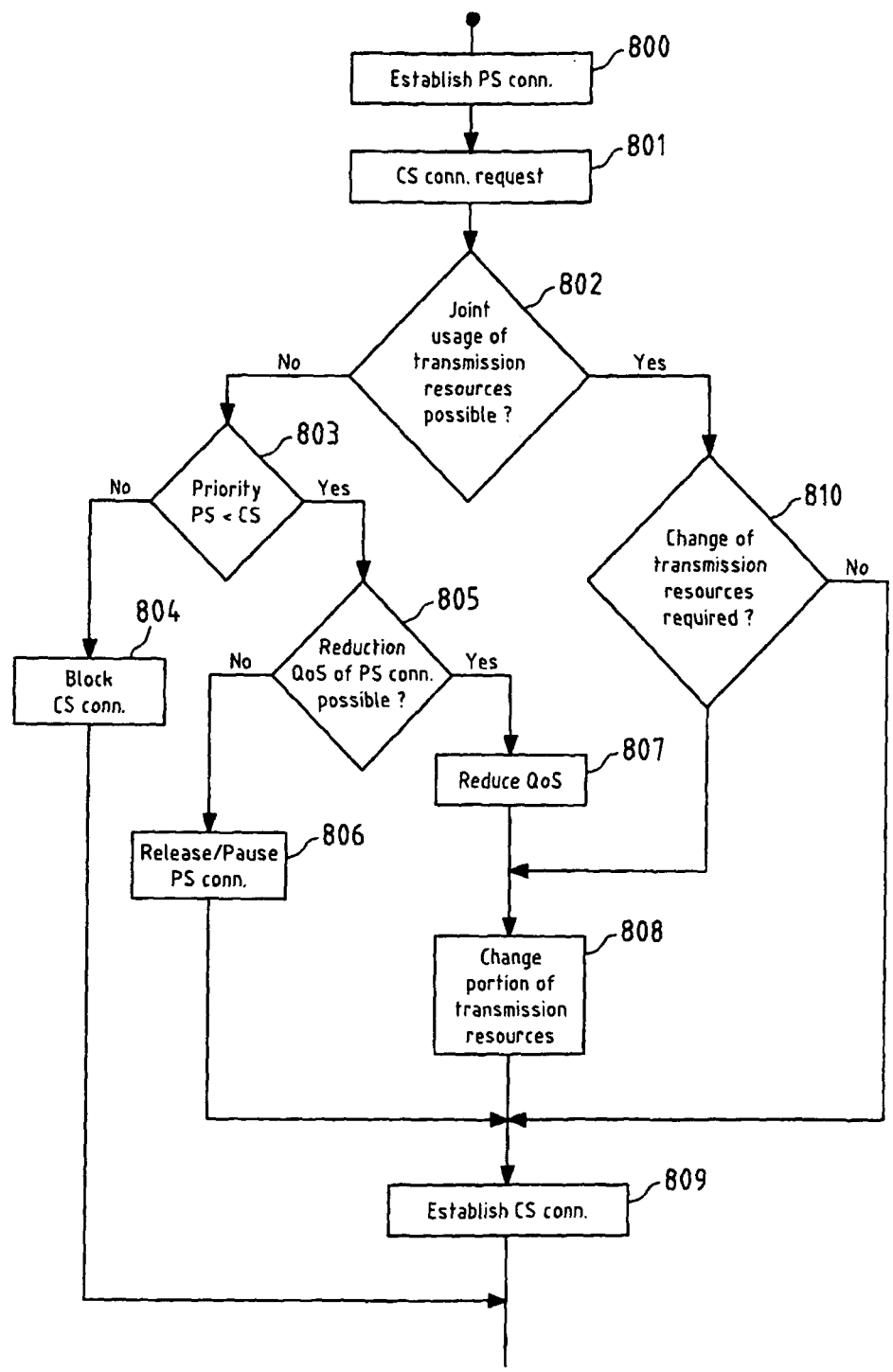
FIG. 8: a flowchart of a possible embodiment of a method according to the present invention.

FIG. 8 is a flowchart of a possible embodiment of a method according to the present invention. The flowchart relates to a scenario wherein a PS connection already has been established and uses a certain portion of the available transmission resources (step 800). In step 801, a CS connection request is received. According to the invention, it is then determined in step 802 whether joint usage of the transmission resources by said PS connection and said CS connection is possible. If this is decided to be false, it is checked if the priority of the PS connection is lower than the priority of the CS connection (step 803). If this is not the case, the CS connection is simply blocked in a step 804. If the priority of the CS connection is higher than that of the PS connection, it is determined in a step 805 if the QoS requirements of the PS connection can be reduced, so that joint usage of the transmission resources becomes possible. If this is not the case, the PS connection is released or paused in a step 806, and the CS connection is established. If this is not the case, the QoS of the PS connection is reduced, and the portion of transmission resources that is assigned to said PS connection is changed (reduced) in a step 808. Finally, said CS connection is established in a step 809. If it is determined in step 802 that joint usage of the transmission resources by both connections is possible, it is checked in step 810 if the portion of the transmission resources that are assigned to said PS connection have to be reduced (the QoS requirements of the PS connection then allow joint usage of the transmission resources by both connection, but the PS connection was assigned a larger portion of transmission resources than is actually required, so that this state has to be altered first). If this is the case, this portion is in fact reduced in step 808, and the CS connection is established in step 809. If this is not the case, the CS connection may directly be established in step 809.

The invention has been described above by means of preferred embodiments. It should be noted that there are alternative ways and variations which are obvious to a skilled person in the art and can be implemented without deviating from the scope and spirit of the appended claims. In particular, the step of checking can be initiated by instances in the mobile station or in the network. Joint usage of the transmission resources by PS connections only, or by CS connection only, or by a mixture of PS and CS connections is possible, and there may be more than two connections jointly using the transmission resources or at least requesting for them. For instance, two PS connections already may have been established, and their usage of transmission resources may be jointly or separately re-negotiated when a further PS or CS connection is to be established. According to the present invention, it may be preferred that the QoS requirements of the connection that has the lower priority are observed in said step of checking, for instance the QoS requirements of a PS connection are observed when checking whether a PS and a CS connection may use the transmission resources jointly. However, also the QoS requirements or demands for transmission resources of the connection with the higher priority may be observed, or QoS requirements of both connections may be observed in said step of checking, in particular if no priorities are defined or if the connections are of the same type, for instance two or more PS connections. It may alternatively be preferred that the QoS requirements of the connection that was established first are considered, which may be either the first or the second connection.

What is claimed is:

1. A method comprising: receiving, at a first entity, a response indicating allowable transmission resources for a first connection between said first entity and a second entity in response to a request for establishing said first connection, said first entity being a client entity, said allowable transmission resources determined at least partially based on a difference between available transmission resources of the first entity and resources required by the first entity for a second connection between said first entity and said second entity before said second connection has been requested, said controlling, at the first entity, the use of at least one portion of said allowable transmission resources by said first connection, said controlling comprising selecting pausing or releasing said first connection if it is later determined that quality of service requirements of said first connection can no longer be guaranteed when said allowable transmission resources are jointly used by said first connection and said second connection.

2. The method according to claim 1, wherein said releasing said first connection is performed when said second connection has a higher priority than the first connection.

3. The method according to claim 1, wherein said controlling the use of at least one portion of said allowable transmission resources comprises reducing quality of service requirements of said first connection and changing the portion of said allowable transmission resources that can be used by said first connection, if it is determined that said quality of service requirements of said first connection can no longer be guaranteed when said allowable transmission resources are jointly used by said first connection and said second connection.

4. The method according to claim 1, wherein said controlling the use of at least one portion of said allowable transmission resources comprises changing the portion of said allowable transmission resources that can be used by said first connection, if it is determined that quality of service requirements of said first connection can be guaranteed when said allowable transmission resources are jointly used by said first connection and said second connection.

5. The method according to claim 1, wherein said controlling is performed before said first connection and said second connection have been established.

6. The method according to claim 1, wherein said controlling is performed after said first connection has been established and before said second connection has been established.

7. The method according to claim 1, wherein said allowable transmission resources characterise the data transmission capabilities of said first and/or second entity.

8. The method according to claim 1, further comprising checking whether quality of service requirements of the first connection can be guaranteed when said allowable transmission resources for a transmission between said first entity and said second entity are jointly used by said first connection and said second connection, and wherein said checking is at least partially performed by a transmission resources control instance that interacts with said first and/or second entity.

9. The method according to claim 1, wherein said allowable transmission resources are hardware capabilities of said first or second entity, and wherein said method further comprises checking said hardware capabilities to determine if quality of service requirements of said first connection can be guaranteed when said hardware capabilities for a transmission between said first entity and said second entity are jointly used by said first connection and said second connection.

10. The method according to claim 1, wherein said entities are contained in a mobile station and in a network of a wireless communication system, in particular a 2G or 3G mobile radio system.

11. The method according to claim 10, wherein said first connection and said second connection are packet-switched and/or circuit-switched connections between said entities in said mobile station and said network.

12. The method according to claim 10, wherein quality of service requirement of said first connection is a minimum bit rate.

13. The method according to claim 10, wherein said wireless communication system is capable of operating a Dual Transfer Mode that comprises a packet-switched connection, in particular a connection according to the General Packet Radio Service or the Enhanced General Packet Radio Service, as said first connection and a circuit-switched connection as said second connection, and wherein said method further comprises determining whether bit rate requirements of said packet-switched connection can be guaranteed when said allowable transmission resources are jointly used by said packet-switched and said circuit switched connection.

14. The method according to claim 13, wherein said packet-switched and circuit-switched connections are provided by a radio bearer, and wherein a transmission resources control instance informs said radio bearer on the availability of said allowable transmission resources.

15. The method according to claim 14, wherein said transmission resources control instance monitors the connections provided by said radio bearer and, based at least on said monitored connections and on hardware profiles of said mobile station, determines the availability of said allowable transmission resources.

16. A computer-readable medium comprising a computer program with instructions operable to cause a processor to:
receive, at a first entity, a response indicating allowable transmission resources for a first connection between said first entity and a second entity in response to a request for establishing said first connection, said first entity being a client entity, said allowable transmission resources determined at least partially based on a difference between available transmission resources of the first entity and resources required by the first entity for a second connection between said first entity and said second entity before said second connection has been requested; and control, at the first entity, the use of at least one portion of said allowable transmission resources by said first connection, said controlling comprising selecting pausing or releasing said first connection if it is later determined that quality of service requirements of said first connection can no longer be guaranteed when said allowable transmission resources are jointly used by said first connection and said second connection.

17. An apparatus comprised in a mobile station, comprising: a receiver configured to receive a response indicating allowable transmission resources for a first connection between a first entity of the mobile station and a second entity in response to a request for establishing said first connection, the first entity being a client entity, the allowable transmission resources determined at least partially based on a difference between available transmission resources of the first entity and resources required by the first entity for a second connection between said first entity and said second entity before said second connection has been requested; and a controller configured to at least partially control the use of at least one portion of said allowable transmission resources by said first connection, said controlling comprising selecting pausing or releasing said first connection if it is later determined that quality of service requirements of said first connection can no longer be guaranteed when said allowable transmission resources are jointly used by said first connection and said second connection.

18. The apparatus according to claim 17, wherein said apparatus is a mobile station in a wireless communication system, and wherein said second entity is comprised in a network of said wireless communication system.

19. The apparatus according to claim 17, wherein said allowable transmission resources characterise the data transmission capabilities of said first entity.

20. The apparatus according to claim 17, wherein said processor is further configured to interact with said first entity.

21. The apparatus according to claim 17, wherein said allowable transmission resources are hardware capabilities of said first or second entity, and wherein said processor is further configured to check said hardware capabilities to determine if quality of service requirements of said first connection can be guaranteed when said hardware capabilities for a transmission between said first entity and said second entity are jointly used by said first connection and said second connection.

22. The apparatus according to claim 18, wherein said wireless communication system is capable of operating a Dual Transfer Mode that comprises a packet-switched connection, in particular a connection according to the General Packet Radio Service or the Enhanced General Packet Radio Service, as said first connection and a circuit-switched connection as said second connection, and wherein said processor is configured to check whether bit rate requirements of said packet-switched connection can be guaranteed when said allowable transmission resources are jointly used by said packet-switched and said circuit switched connection.

23. The apparatus according to claim 22, wherein said packet-switched and circuit-switched connections are provided by a radio bearer, and wherein said processor is configured to inform said radio bearer on the availability of said allowable transmission resources.

24. The apparatus according to claim 17, wherein said processor is configured to monitor the connections provided by said radio bearer and to determine the availability of said allowable transmission resources, wherein said determining is at least based on said monitored connections and on hardware profiles of said first entity.

25. The apparatus according to claim 17, wherein said apparatus is a network element in a wireless communication system, wherein said first entity is comprised in a mobile station of said wireless communication system, and wherein said second entity is comprised in said network element.

26. An apparatus comprised in a mobile station, comprising: means for receiving a response indicating allowable transmission resources for a first connection between a first entity of the mobile station and a second entity in response to a request for establishing said first connection, the first entity being a client entity, said allowable transmission resources determined at least partially based on a difference between available transmission resources of the first entity and resources required by the first entity for a second connection between said first entity and said second entity before said second connection has been requested; and means for at least partially controlling the use of at least one portion of said allowable transmission resources by said first connection, said controlling comprising selecting pausing or releasing said first connection if it is later determined that quality of service requirements of said first connection can no longer be guaranteed when said allowable transmission resources are jointly used by said first connection and said second connection.

27. The apparatus according to claim 17, wherein said pausing or releasing said first connection, is performed when said second connection has a higher priority than the first connection.

28. The apparatus according to claim 17, wherein said controller is configured to control the use of at least one portion of said allowable transmission by reducing quality of service requirements of said first connection and by changing the portion of said allowable transmission resources that can be used by said first connection, if it is determined that said quality of service requirements of said first connection can no longer be guaranteed when said allowable transmission resources are jointly used by said first connection and said second connection.

29. The apparatus according to claim 17, wherein said controller is configured to control the use of at least one portion of said allowable transmission resources by changing the portion of said allowable transmission resources that can be used by said first connection, if it is determined that quality of service requirements of said first connection can be guaranteed when said allowable transmission resources are jointly used by said first connection and said second connection.

30. The apparatus according to claim 17, wherein said processor and said controller are configured to perform said controlling before said first connection and said second connection have been established.

31. The apparatus according to claim 17, wherein said processor and said controller are configured to perform said controlling after said first connection has been established and before said second connection has been established.

32. The apparatus according to claim 18, wherein said first connection and said second connection are packet-switched and/or circuit-switched connections between said entities in said mobile station and said network.

33. The apparatus according to claim 18, wherein quality of service requirement of said first connection is a minimum bit rate.

34. The apparatus according to claim 17, wherein said first connection and said second connection are provided by the same bearer.

35. The method according to claim 1, wherein said first connection and said second connection are provided by the same bearer.

* * * * *

UNITED STATES PATENT AND TRADEMARK OFFICE
CERTIFICATE OF CORRECTION

PATENT NO. : 8,712,423 B1
APPLICATION NO. : 10/530256
DATED : April 29, 2014
INVENTOR(S) : J. Oksala et al.

It is certified that error appears in the above-identified patent and that said Letters Patent is hereby corrected as shown below:

On the Title Page, Item (54) and in the Specification, Column 1, Line 3, Title: "DUALTRANSFER" should read --DUAL TRANSFER--

In the Specification

Column 9, Line 65: "be," should read --be--
Column 11, Lines 7-8: "may be be" should read --may be--
Column 12, Line 52: "cal" should read --call--
Column 13, Lines 22-37: "However, according to the example of FIG. 3, the mobile station now moves into a cell that supports DTM, as indicated by step 300. A call instance 201 becomes aware of this in step 301 and sends a DTM availability indication 302 to said QoS & DTM control instance 203. The QoS & DTM control instance 203 now performs a Context Configure procedure comprising the steps 303-311 that corresponds to the Context Configure procedure 209-217 in FIG. 2. In brief, the allowable GBR is determined, signaled to the client who determines if it is acceptable for its PS connection, and, if this is the case, changes its GBR accordingly. After said Context Configure procedure, said QoS & DTM control instance 203 set an internal DTM state to OK in order to indicate that an establishment of a future CS connection now is possible jointly to the already existing PS connection. This may happen in a step 313."

should read:

--However, when comparing the allowed GBR against the minimum acceptable QoS requirements of the PS connection in step 405, it is decided at the client side 200 that the PS connection can not be maintained with a QoS that allows the application that uses said PS connection to function properly, so that the PS connection and the application running on top of it have to be paused. The pausing of the application is signaled to the network 204 with a message 406 and acknowledged by the network in step 407. Then the pausing of the PS connection is signaled between client 200 and GPRS bearer 202 in steps 408 and 409. After the PS connection is paused, the GPRS bearer 202 can respond to the Context Configure Request 209 of the QoS & DTM control instance 203 in a step 410, and the QoS &

Signed and Sealed this
Thirty-first Day of March, 2015

Michelle K. Lee
*Director of the United States Patent and Trademark Office*

CERTIFICATE OF CORRECTION (continued)

U.S. Pat. No. 8,712,423 B1

DTM control instance 203 then responds to the Check Request 207 of the call instance 201 with an OK in step 411, so that the CS connection now can be established in step 412.--

Column 14, Line 31, "GER." should read --GBR.--

In the Claims

Column 16, Line 50, Claim 2: "said releasing" should read --said pausing or releasing--
Column 17, Line 37, Claim 12: "wherein quality" should read --wherein said quality--

UNITED STATES PATENT AND TRADEMARK OFFICE
CERTIFICATE OF CORRECTION

PATENT NO. : 8,712,423 B1  Page 1 of 1
APPLICATION NO. : 10/530256
DATED : April 29, 2014
INVENTOR(S) : Oksala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this

Twenty-ninth Day of September, 2015

Michelle K. Lee
*Director of the United States Patent and Trademark Office*